United States Patent
Lindstrom et al.

(10) Patent No.: US 9,798,789 B2
(45) Date of Patent: Oct. 24, 2017

(54) METHOD AND SYSTEM FOR TRACKING CHANGES TO USER CONTENT IN AN ONLINE SOCIAL NETWORK

(75) Inventors: Kent Lindstrom, San Francisco, CA (US); Ross A. MacKinnon, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 847 days.

(21) Appl. No.: 11/531,154

(22) Filed: Sep. 12, 2006

(65) Prior Publication Data
US 2008/0065701 A1    Mar. 13, 2008

(51) Int. Cl.
*G06F 17/30* (2006.01)
*G06F 21/62* (2013.01)

(52) U.S. Cl.
CPC .. *G06F 17/30569* (2013.01); *G06F 17/30873* (2013.01); *G06F 17/30899* (2013.01); *G06F 17/30696* (2013.01); *G06F 17/30864* (2013.01); *G06F 21/6227* (2013.01)

(58) Field of Classification Search
None
See application file for complete search history.

(56) References Cited

U.S. PATENT DOCUMENTS

| | | | |
|---|---|---|---|
| 5,572,643 A | 11/1996 | Judson | |
| 6,324,541 B1 | 11/2001 | de l'Etraz | |
| 6,879,965 B2 | 4/2005 | Fung et al. | |
| 7,231,176 B2 | 6/2007 | Levy | |
| 7,249,123 B2 | 7/2007 | Elder et al. | |
| 7,359,894 B1 * | 4/2008 | Liebman | G06F 17/30867 |
| 7,433,876 B2 | 10/2008 | Spivack | |
| 7,539,697 B1 * | 5/2009 | Akella et al. | |
| 7,596,597 B2 * | 9/2009 | Liu et al. | 709/204 |
| 7,613,769 B1 | 11/2009 | Hess | |
| 7,669,123 B2 | 2/2010 | Zuckerberg et al. | |
| 7,730,143 B1 * | 6/2010 | Appelman | 709/206 |
| 7,797,732 B2 | 9/2010 | Tam | |
| 7,831,658 B2 | 11/2010 | Khopkar | |
| 7,832,003 B2 * | 11/2010 | Kelly et al. | 726/18 |
| 7,991,764 B2 | 8/2011 | Rathod | |
| 8,037,093 B2 | 10/2011 | Tiu, Jr. | |
| 8,171,128 B2 | 5/2012 | Zuckerberg | |
| 8,682,995 B1 | 3/2014 | Lawler | |

(Continued)

OTHER PUBLICATIONS

Tiu et al., *Feeding Updates to Landing Pages of Users of an Online Social Network From External Sources*, Notice of Allowance from USPTO for U.S. Appl. No. 11/624,088, dated Jun. 6, 2011.

(Continued)

*Primary Examiner* — Rehana Perveen
*Assistant Examiner* — Raheem Hoffler
(74) *Attorney, Agent, or Firm* — Baker Botts L.L.P.

(57) ABSTRACT

Content maintained in an online social network or other online communities is tracked for changes and updates. The content may include user profiles, digital photos, digital audio and video files, testimonials, and identification of users who are friends. When such change or update occurs, users of the online social network or online community are notified according to various criteria that they have set. The notification may be provided by e-mail, an RSS feed, or a web page when accessed. With this feature, users can browse through content of other users with efficiency.

24 Claims, 6 Drawing Sheets

(56) References Cited

U.S. PATENT DOCUMENTS

| | | | |
|---|---|---|---|
| 8,694,542 | B2 | 4/2014 | Tiu, Jr. |
| 9,479,474 | B2 | 10/2016 | Norton |
| 2002/0016786 | A1* | 2/2002 | Pitkow et al. .................. 707/3 |
| 2003/0018719 | A1 | 1/2003 | Ruths |
| 2003/0158855 | A1 | 8/2003 | Farnham |
| 2004/0044566 | A1 | 3/2004 | Bostelmann et al. |
| 2004/0060129 | A1 | 4/2004 | Juett |
| 2004/0088325 | A1 | 5/2004 | Elder |
| 2005/0060417 | A1 | 3/2005 | Rose |
| 2005/0193010 | A1 | 9/2005 | DeShan |
| 2005/0198299 | A1 | 9/2005 | Beck et al. |
| 2005/0203801 | A1 | 9/2005 | Morgenstern et al. |
| 2005/0216300 | A1 | 9/2005 | Appelman |
| 2005/0256866 | A1 | 11/2005 | Lu |
| 2005/0283753 | A1 | 12/2005 | Ho |
| 2006/0015540 | A1 | 1/2006 | Takeda |
| 2006/0047419 | A1 | 3/2006 | Diendorf |
| 2006/0048059 | A1 | 3/2006 | Etkin |
| 2006/0085370 | A1 | 4/2006 | Groat |
| 2006/0085419 | A1 | 4/2006 | Rosen |
| 2006/0117378 | A1 | 6/2006 | Tam |
| 2006/0136419 | A1* | 6/2006 | Brydon ............... G06Q 10/107 |
| 2006/0173841 | A1* | 8/2006 | Bill .................. G01C 21/3407 |
| 2006/0230061 | A1* | 10/2006 | Sample ................ G06Q 10/10 |
| 2006/0240856 | A1 | 10/2006 | Counts |
| 2006/0259957 | A1* | 11/2006 | Tam ....................... G06F 21/10 726/3 |
| 2007/0005754 | A1* | 1/2007 | Horvitz et al. .............. 709/224 |
| 2007/0011665 | A1 | 1/2007 | Gandhi |
| 2007/0038712 | A1 | 2/2007 | Affronti |
| 2007/0060129 | A1 | 3/2007 | Ramer et al. |
| 2007/0094389 | A1 | 4/2007 | Nussey |
| 2007/0100960 | A1 | 5/2007 | Eichstaedt |
| 2007/0106627 | A1* | 5/2007 | Srivastava et al. ............ 706/20 |
| 2007/0136178 | A1* | 6/2007 | Wiseman et al. ............... 705/37 |
| 2007/0171716 | A1* | 7/2007 | Wright et al. .......... 365/185.12 |
| 2007/0174247 | A1 | 7/2007 | Xu |
| 2007/0220010 | A1* | 9/2007 | Ertugrul ......................... 707/10 |
| 2007/0239538 | A1 | 10/2007 | Misra |
| 2007/0255785 | A1 | 11/2007 | Hayashi |
| 2007/0282959 | A1* | 12/2007 | Stern ............................ 709/206 |
| 2007/0282980 | A1 | 12/2007 | Fischer |
| 2008/0059576 | A1 | 3/2008 | Liu |
| 2008/0065604 | A1* | 3/2008 | Tiu et al. ......................... 707/3 |
| 2008/0091834 | A1* | 4/2008 | Norton .......................... 709/229 |
| 2008/0172288 | A1* | 7/2008 | Pilskalns et al. ............... 705/10 |
| 2008/0222060 | A1 | 9/2008 | Perng |
| 2008/0228887 | A1* | 9/2008 | Robertson ............. G06Q 10/02 709/206 |
| 2010/0030734 | A1 | 2/2010 | Chunilal |

OTHER PUBLICATIONS

U.S. Appl. No. 13/269,307, filed Oct. 7, 2011, William K. Tiu, Jr.
U.S. Appl. No. 13/277,032, filed Oct. 19, 2011, William K. Tiu, Jr.
U.S. Appl. No. 13/277,043, filed Oct. 19, 2011, William K. Tiu, Jr.
U.S. Appl. No. 13/277,053, filed Oct. 19, 2011, William K. Tiu, Jr.
U.S. Appl. No. 13/312,823, filed Dec. 6, 2011, William K. Tiu, Jr.
U.S. Appl. No. 13/313,895, filed Dec. 7, 2011, William K. Tiu, Jr.
U.S. Appl. No. 13/313,915, filed Dec. 7, 2011, William K. Tiu, Jr.
Search Report for WO 2007/052285, dated May 10, 2007.
Submission of Prior Art Under 37 CFR1.501 for now U.S. Pat. No. 8,037,093, Oct. 17, 2011.
Submission of Prior Art Under 37 CFR1.501 for U.S. Publication No. 2012/0030286, May 26, 2012.
Submission of Prior Art Under 37 CFR1.501 for U.S. Publication No. 2012/0036213, May 26, 2012.
Submission of Prior Art Under 37 CFR1.501 for U.S. Publication No. 2012/0036260, May 26, 2012.
U.S. Appl. No. 14/179,382, filed Feb. 12, 2014, Tiu Jr.
U.S. Appl. No. 14/491,361, filed Sep. 19, 2014, Tiu Jr.
U.S. Appl. No. 14/497,510, filed Sep. 26, 2014, Tiu Jr.

\* cited by examiner

Friend Tracker Settings  410                    430

I would like to be notified of the following updates:

☐ Profile Changes
☐ New Photos
☐ New Friends/Members
☐ New Testimonials

I would like to be notified by:

☐ Home page
☐ E-mail
☐ RSS feed to another web site (specify)

440

420  made to the content of the following users and/or groups:

☐ All 1st Degree Friends
☐ Select 1st Degree Friends (specify)
☐ Select Users (specify)
☐ Bookmarked Profiles (specify)
☐ Select Groups (specify)

Frequency of notification:

☐ As it happens
☐ Once per day
☐ Once per week

450

☐ TURN OFF ALL NOTIFICATIONS

FIG. 4A

Friend Tracker

Latest Updates                                                More Friend Updates

Tammy
added new friend(s), last updated 9/7/2006

Sarah
received new testimonial(s), added new friend(s), last updated 9/7/2006

Elton
updated his profile, last updated 9/7/2006

Giants Fan Club
added new member(s), last updated 9/7/2006

METHOD AND SYSTEM FOR TRACKING CHANGES TO USER CONTENT IN AN ONLINE SOCIAL NETWORK

BACKGROUND OF THE INVENTION

Field of the Invention

The present invention generally relates to processing of online social network data, and more particularly, to a method and system for tracking changes to user content in an online social network.

Description of the Related Art

Over the past several years, the amount of personal information that individuals share online has increased dramatically. Many web sites provide an online community that provides content focusing on a common interest or theme, and allows people to join the online community and share personal information with other users of the online community. Online social networking sites have also been rapidly gaining in popularity. Typically, users of an online social network communicate with one another and meet other users based on personal information captured in the other user profiles.

Also, users of online social networks often request their existing friends to join, creating a web of online relationships that mirror offline ones. Operators of online social networking sites typically require that new users provide certain personal information to join, including contact information (e.g., physical and e-mail addresses, telephone numbers, instant messaging nicknames, etc.) and identifying information (e.g. a name, location, personal interests, age, etc.).

A positive consequence of this general trend is the greater ability for groups of friends, families and other acquaintances to communicate online with, and about, each other as users of a social network. For example, a group of friends may share personal information with each other about common interests, individual personal attributes, events, schedules and activity plans and may also access each others' personal information. Another benefit of online social networks is that their users can more easily find others who share common interests, goals, lifestyles, etc., without being limited to an online community dedicated to a particular interest. Doing so allows members to expand their social networks.

With access to cheap storage and higher bandwidths, the amount of information stored by users of online social networks has grown exponentially. In addition to profile information, the users now often store large amounts of multimedia files, including digital photos, and digital audio and video files. As a consequence, the process of browsing the content of other users has become highly inefficient.

SUMMARY OF THE INVENTION

The present invention provides a system and a method for improving the efficiency of finding and viewing content of users or groups of an online social network or other online communities. According to embodiments of the present invention, changes and updates to user or group content are tracked, and users are notified of certain of these changes and updates according to various criteria. The notification may be given by e-mail, a Real Simple Syndication (RSS) feed, or a web page when accessed.

The system according to an embodiment of the present invention includes a database of users in which content for each user is stored, and a processing unit that is programmed to carry out the steps of receiving and storing inputs from users that reflect changes in their content and communicating to applicable users that such changes have occurred. For example, if a first user is tracking changes to the content of a particular type of a second user and the second user changes such content, the first user will be notified that the content of that particular type of the second user has changed.

The method according to an embodiment of the present invention is carried out in a computer system having a database of users in which content for each user is stored, and includes the steps of receiving and storing inputs from users that reflect changes to their content and communicating to applicable users that such changes have occurred.

The method according to another embodiment of the present invention is carried out in an online community of users, and includes the steps of receiving inputs from a user that specify one or more types of content that are to be tracked and users who are to be tracked, monitoring updates to the content of the users and identifying those updates that are made to content that is of one of the specified types and of one of the specified users, and notifying the user of the identified updates.

The advantages of the tracking and notification techniques employed in the embodiments of the present invention are several. First, a user need not constantly browse through the content of other users to see if such content has been updated. Second, a member can define a filter for the content updates by selecting the users that he or she would like to track and the type of content updates that he or she is interested in tracking. Third, a user can select different ways of being notified of the content updates as well as the frequency of the notifications.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 4A is a schematic illustration of a web page used to specify various notification settings;

DETAILED DESCRIPTION

Figure 1:
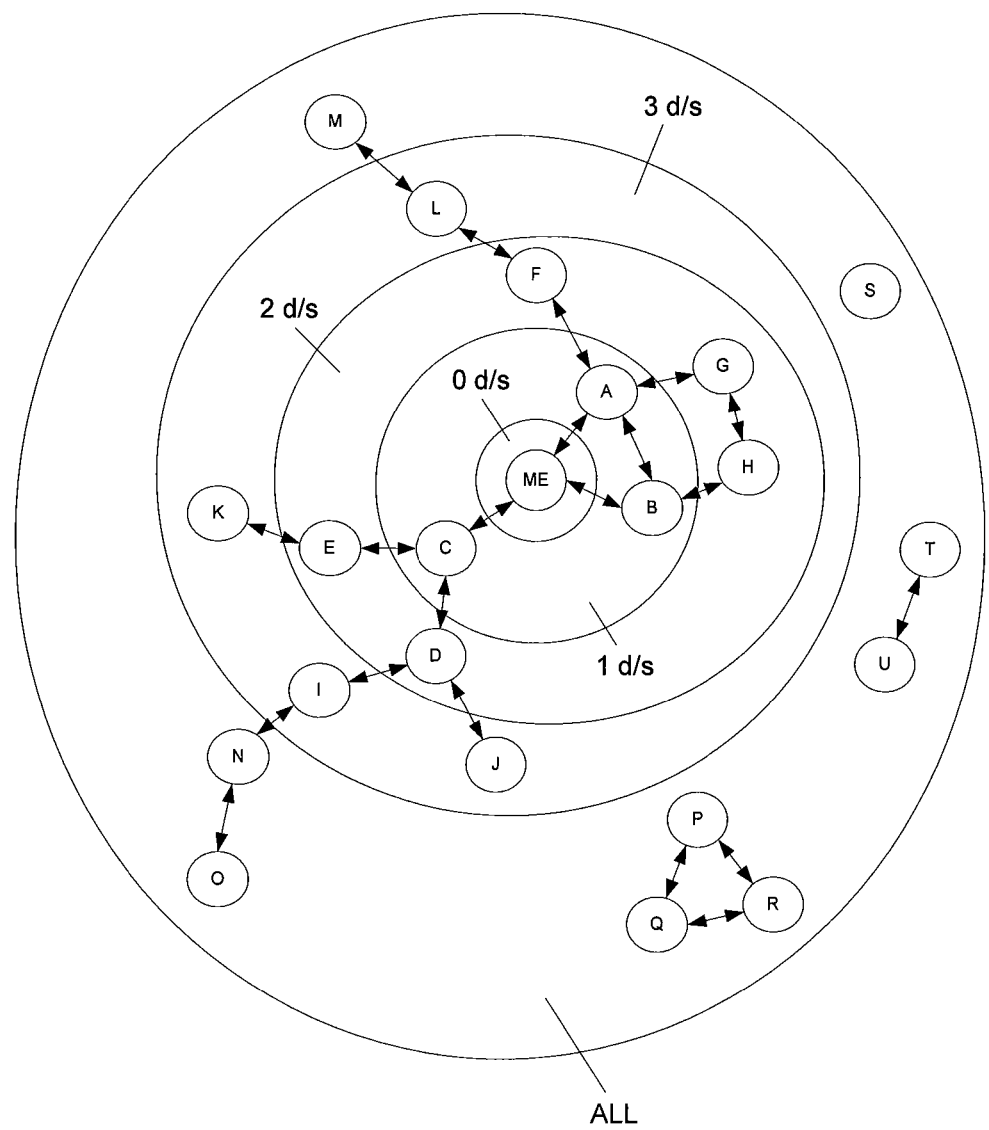
FIG. 1 is a diagram that graphically represents the relationships between users of an online social network.

FIG. 1 is a graph representation of a social network centered on a given individual (ME). Other users of this social network include A-U whose position, relative to ME's, is referred to by the degree of separation between ME and each other user. Friends of ME, which includes A, B, and C, are separated from ME by one degree of separation (1 d/s). A friend of a friend of ME is separated from ME by 2 d/s. As shown, D, E, F, G, and H are each separated from ME by 2 d/s. A friend of a friend of a friend of ME is separated from ME by 3 d/s. FIG. 1 depicts all nodes separated from ME by more than 3 degrees of separation as belonging to the category ALL.

Degrees of separation in a social network are defined relative to an individual. For example, in ME's social network, H and ME are separated by 2 d/s, whereas in G's social network, H and G are separated by only 1 d/s. Accordingly, each individual will have their own set of first, second and third degree relationships.

As those skilled in the art understand, an individual's social network may be extended to include nodes to an Nth degree of separation. As the number of degrees increases beyond three, however, the number of nodes typically grows at an explosive rate and quickly begins to mirror the ALL set.

Figure 2:
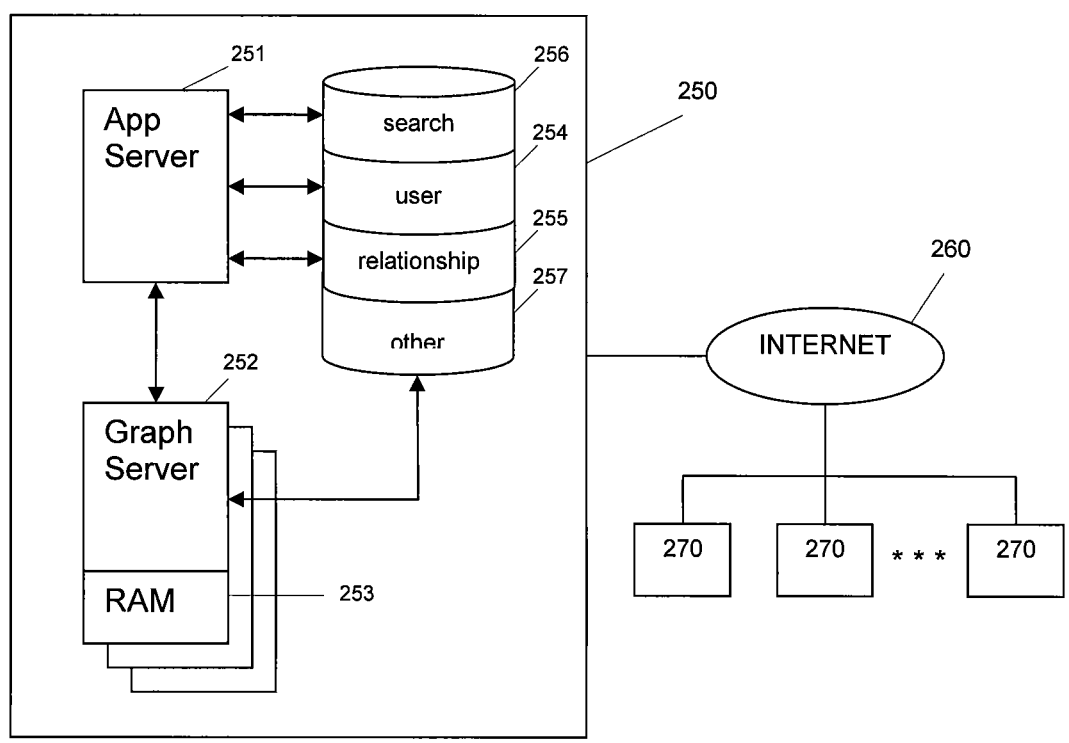
FIG. 2 is a block diagram illustrating components of a system for managing an online social network.

FIG. 2 is a block diagram illustrating a system 250 for creating and managing an online social network. The system 250 represents one example embodiment of a system for creating and managing an online social network, and includes an application server 251 and one or more graph servers 252. As known in the art, a server is a computer having a processing unit and system memory that is programmed to carry out certain functions. The system 250 is connected to a network 260, e.g., the Internet, and accessible over the network by a plurality of remote computers (only three of which are shown), collectively designated as 270.

The application server 251 manages a user database 254, a relationship database 255, a search database 256, and other databases 257. The user database 254 contains profile information for each of the user in the online social network managed by the system 250. The profile information may include, among other things: a unique user identifier (user ID), name, age, gender, location, hometown, references to image files, listing of interests, attributes, and the like. The user database 254 also contains information about groups (e.g., organizations, school alumni associations, family, etc.) that users have defined. The group information may include, among other things: a unique group identifier (group ID), name, description of the group, and members of the group. The relationship database 255 stores for each user, the user IDs of all users with whom the user has a direct relationship, i.e., direct friends of the user who are users of the online social network. In addition, the contents of the user database 254 are indexed and optimized for search, and stored in the search database 256. The other databases 257 may include a database for storing testimonials, and various other information commonly stored in online social networks and communities. The user database 254, the relationship database 255, the search database 256, and the other databases 257 are updated to reflect inputs of new user information and edits of existing user information that are made through the remote computers 270.

The application server 251 also manages the information exchange requests that it receives from the remote computers 270. The graph servers 252 receive a query from the application server 251, process the query and return the query results to the application server 251. The graph servers 252 manage a representation of the social network for all users in the member database. The graph servers 252 have a dedicated memory device 253, such as a random access memory (RAM), in which an adjacency list that indicates all first degree relationships in the social network is stored. The graph servers 252 respond to requests from application server 251 to identify relationships and the degree of separation between users of the online social network.

In the embodiments of the present invention described below, users are respectively operating the remote computers 270 that are programmed to execute web browser programs, and access the web pages managed by the application server 251 using the web browser programs. The web pages that are displayed to a user are transmitted from the application server 251 to that user's remote computer and processed by the web browser program stored in that user's remote computer for display through the monitor of that user's remote computer.

Figure 3:
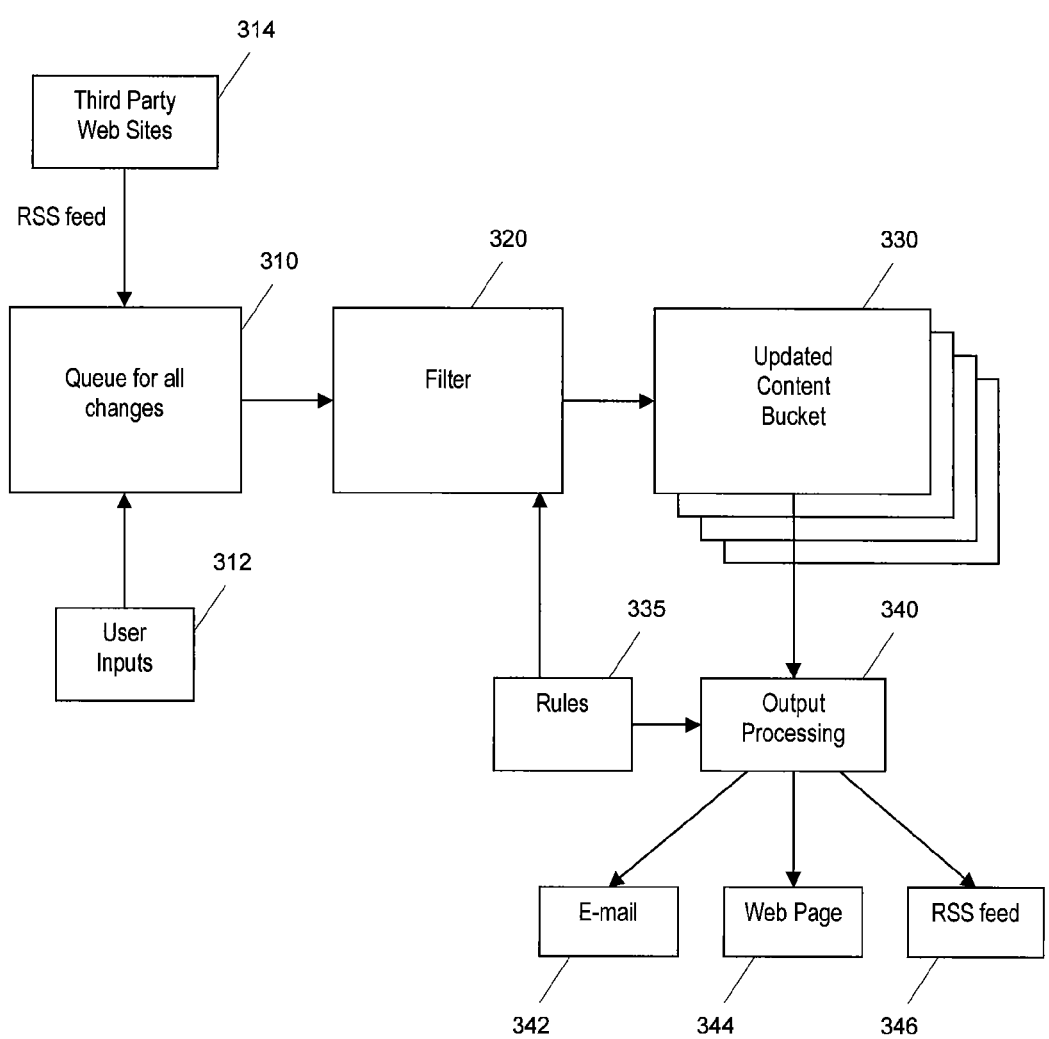
FIG. 3 schematically illustrates the process for tracking changes and updates to content in an online social network and managing the notification of such changes and updates.

FIG. 3 schematically illustrates the process for tracking changes and updates to content in an online social network and managing the notification of such changes and. Blocks 310, 320, 330, 335, 340 represent the operations that are being carried out by the application server 251. Block 312 represents the user inputs that are made through a browser running on a remote computer and are transmitted over the Internet to the application server 251. Block 314 represents certain inputs that are made at third party web sites 314, such as flickr, YouTube, xanga.com, and eBay, and transmitted over the Internet to the application server 251 using an RSS feed. All such inputs are aggregated and stored in a queue 310 that is managed by the application server 251.

The items stored in the queue 310 then undergo a filter process 320 one at a time on a first-in, first-out basis. The filter process 320 examines the items in the queue 310 and supplies them to updated content buckets 330, which represents a series of memory regions that have been allocated to the users of the online social network. The filter process 320 selectively supplies the items in the queue 310 to the updated content buckets 330 in accordance with rules 335 that have been defined for the users. For example, the filter process 320 selectively supplies the items in the queue 310 to the updated content bucket 330 of user A in accordance with rules 335 that have been defined for user A; the filter process 320 selectively supplies the items in the queue 310 to the updated content bucket 330 of user B in accordance with rules 335 that have been defined for user B; and so forth. For each user, the rules 335 include an identification of those users or groups whose content he or she desires to track and specify the type of content updates or changes that he or she desires to track. By applying these rules to the filter process 320, the items stored in the queue 310 are stored in an updated content bucket 330 of a user only if such items represent content updates or changes of another user or group that he or she desires to track and are of the type that he or she desires to track.

The items stored in the updated content buckets 330 undergo output processing 340. The output processing 340 is carried out separately for each of the different updated content buckets 330 and in accordance with the rules 335 defined by the user who is associated with the updated content bucket. For each user, the rules 335 specify the frequency of the output processing 340, and the method of notification, whether by e-mail 342, a web page 344, or an RSS feed 346.

FIG. 4A is a schematic illustration of a web page used to specify notification settings that define the rules 335. In section 410, the user selects the type of content updates or changes he or she desires to track. In section 420, the user specifies those other users or groups whose content he or she desires to track. In section 430, the user selects the method of notification. In section 440, the user selects the frequency of notification. In section 450, the user has the option of turning off all notifications. Certain selections on the web page require the user to supply additional information through the "specify" hyperlink. For example, the user selects from a list of friends, users, bookmarked profiles, or groups in section 420 if one of these options is checked. In certain embodiments, the user is given the option to select all friends who are within 1, 2, or 3 degrees of separation. Also, if the user selects the RSS feed option in section 430, the user is asked to specify the URL to which the RSS feed will be transmitted and user ID and password that are required to access such URL.

Figure 4B:
FIG. 4B is a schematic illustration of a web page used to communicate changes and updates to user content.
Figure 4B:
Figure 4B:
Figure 4B:
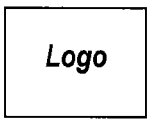

FIG. 4B is a schematic illustration of a web page used to communicate to a user of the changes and updates to content of other users of the online social network. This web page is displayed when the user accesses his or her homepage of the online social network. This means that the user has selected at least the "Home page" option in section 430 of FIG. 4A. If the user has also selected the "E-mail" option and the "RSS feed" option, the user will be notified of the updates noted below by those methods as well. The first entry indicates that the user, Tammy, added new friends. The second entry indicates that the user, Sarah, received new testimonials. The third entry indicates that the user, Elton, updated his profile. The fourth entry indicates that the group, Giants Fan Club, added new members. These entries indicate that the user has selected at least the first, third, and fourth options in section 410. They also indicate that the user is tracking the updates of at least Tammy, Sarah, Elton, and the Giants Fan Club. For simplicity, the user is notified of a fixed number of most recent content updates (in this example, 4). The user can view more updates by accessing the hyperlink, "More Friend Updates."

Figure 5:
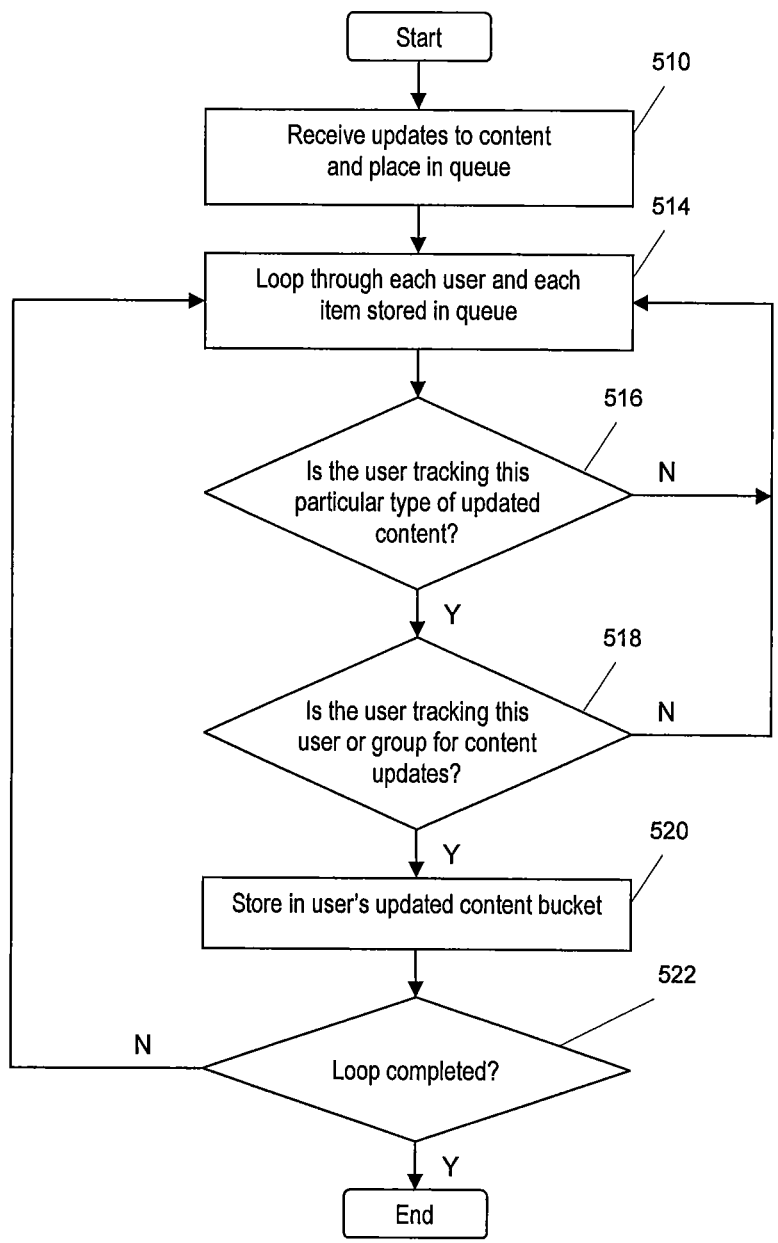
FIG. 5 is a flow diagram illustrating the process steps for filtering the changes and updates to user content.

FIG. 5 is a flow diagram illustrating the process steps for filtering changes and updates to content in an online social network. These process steps are carried out by the application server 251 as it is carrying out the operations represented by blocks 310, 320 shown in FIG. 3, and represents one illustrative way of how changes and updates to content can be processed so that applicable users can be notified of such changes and updates.

In step 510, user inputs that reflect updates and changes to content are received and stored in a queue. The items stored in the queue are then processed one at a time and per user in accordance with steps 514-522. Step 514 represents the beginning of the loop. In this step, an item stored in the queue and a user are selected for processing. Each time through the loop, a next user is selected. If all users have been selected, then the first user and a next item stored in the queue are selected for processing.

In step 516, the selected user's rules are examined to see if the queue item being processed is of the type that the user is tracking. If it is, the process continues to step 518. If not, the process returns to the beginning of the loop. In step 518, the selected user's rules are examined to see if the queue item being processed is an update made by a user or group that the selected user is tracking. If it is, the process continues to step 520. If not, the process returns to the beginning of the loop. In step 520, the item being processed is stored in the selected user's updated content bucket. Step 522 checks to see if all items in the queue have been processed for all users. If this condition is true, the process ends. If not, the process returns to the beginning of the loop.

While particular embodiments according to the invention have been illustrated and described above, those skilled in the art understand that the invention can take a variety of forms and embodiments within the scope of the appended claims.

What is claimed is:

1. A method comprising, by one or more computer systems of an online social network:
    accessing a graph data structure comprising a plurality of nodes and connections between the nodes, each of one or more of the nodes being associated with one of a plurality of users of the online social network, each connection between two nodes representing a relationship between them and establishing a single degree of separation between them;
    accessing information associated with a first user of the online social network, the first user being associated with a first node of the plurality of nodes, the information indicating that the first user wants to track whether new connections with one or more second nodes of the plurality of nodes are formed on a third-party system that is external to the online social network, each of the second nodes being separated in the graph data structure from the first node by one degree of separation;
    receiving, from the third-party system, information indicating that a second user associated with one of the second nodes has a new relationship with a third user, the third user being associated with a third node of the plurality of nodes, the third node being separated in the graph data structure from the second node by one degree of separation;
    storing the information from the third-party system in a queue that contains previously-stored information from the third-party system;
    processing the information stored in the queue on a first-in-first-out basis by:
        determining that the previously-stored information is of interest to the first user based on the information associated with the first user;
        storing the previously-stored information in one of a plurality of memory buckets associated with the plurality of users of the online social network, wherein the memory bucket is associated with the first user;
        after storing the previously-stored information in the memory bucket associated with the first user, determining that the information from the third-party system is of interest to the first user based on the information associated with the first user; and
        storing the information from the third-party system in the memory bucket associated with the first user;
    processing the information stored in the memory bucket associated with the first user, wherein the processing is triggered based on a notification frequency specified by the first user; and
    notifying the first user of (1) an event associated with a fourth user associated with one of the second nodes based on the processed previously-stored information and (2) the new relationship between the second user and the third user based on the processed information from the third-party system.

2. The method of claim 1, further comprising receiving input data items from the third-party system that indicate whether a connection with one of the second nodes is formed on the third-party system.

3. The method of claim 2, further comprising storing the input data items in a memory.

4. The method of claim 1, wherein one or more second users associated with the one or more second nodes interact with the third-party system to change, add or update content on the third-party system.

5. The method of claim 1, wherein notifying the first user comprises communicating a description of the new relationship.

6. The method of claim 5, wherein the description is transmitted to the first user as part of a web page.

7. The method of claim 5, wherein the description is transmitted to the first user as part of an RS S feed.

8. The method of claim 5, wherein the description is transmitted to the first user as part of an e-mail.

9. The method of claim 1, wherein the information associated with the first user further identifies one or more types of content that the first user wants to track.

10. The method of claim 1, wherein the information associated with the first user further identifies one or more third-party systems that the first user wants to track.

11. The method of claim 4, wherein the content comprises one or more of a user profile, a digital photo, text, a testimonial by other users, or identification of users who are friends.

12. The method of claim 4, wherein notifying the first user comprises communicating to the first user that the content associated with the second nodes has been changed, added to, or updated on the third-party system.

13. A computer system of an online social network comprising: one or more processors, the processors operable when executing instructions to:
 access a graph data structure comprising a plurality of nodes and connections between the nodes, each of one or more of the nodes being associated with one of a plurality of users of the online social network, each connection between two nodes representing a relationship between them and establishing a single degree of separation between them;
 access information associated with a first user of the online social network, the first user being associated with a first node of the plurality of nodes, the information indicating that the first user wants to track whether new connections with one or more second nodes of the plurality of nodes are formed on a third-party system that is external to the online social network, each of the second nodes being separated in the graph data structure from the first node by one degree of separation;
 receive, from the third-party system, information indicating that a second user associated with one of the second nodes has a new relationship with a third user, the third user being associated with a third node of the plurality of nodes, the third node being separated in the graph data structure from the second node by one degree of separation;
 store the information from the third-party system in a queue that contains previously-stored information from the third-party system;
 process the information stored in the queue on a first-in-first-out basis by:
  determine that the previously-stored information is of interest to the first user based on the information associated with the first user;
  store the previously-stored information in one of a plurality of memory buckets associated with the plurality of users of the online social network, wherein the memory bucket is associated with the first user;
  after storing the previously-stored information in the memory bucket associated with the first user, determine that the information from the third-party system is of interest to the first user based on the information associated with the first user; and
  store the information from the third-party system in the memory bucket associated with the first user;
 process the information stored in the memory bucket associated with the first user,
 wherein the processing is triggered based on a notification frequency specified by the first user; and
  notify the first user of (1) an event associated with a fourth user associated with one of the second nodes based on the processed previously-stored information and (2) the new relationship between the second user and the third user based on the processed information from the third-party system.

14. The system of claim 13, wherein the processors are further operable when executing instructions to receive input data items from the third-party system that indicate whether a connection with one of the second nodes is formed on the third-party system.

15. The system of claim 14, wherein the processors are further operable when executing instructions to store the input data items in a memory.

16. The system of claim 13, wherein one or more second users associated with the one or more second nodes interact with the third-party system to change, add or update content on the third-party system.

17. The system of claim 13, wherein to notify the first user comprises communicating a description of the new relationship.

18. The system of claim 17, wherein the description is transmitted to the first user as part of a web page.

19. The system of claim 17, wherein the description is transmitted to the first user as part of an RSS feed.

20. The system of claim 17, wherein the description is transmitted to the first user as part of an e-mail.

21. The system of claim 13, wherein the information associated with the first user further identifies one or more types of content that the first user wants to track.

22. The system of claim 13, wherein the information associated with the first user further identifies one or more third-party systems that the first user wants to track.

23. The system of claim 16, wherein the content comprises one or more of a user profile, a digital photo, text, a testimonial by other users, or identification of users who are friends.

24. The system of claim 16, wherein to notify the first user comprises to communicate to the first user that the content associated with the second nodes has been changed, added to, or updated on the third-party system.

* * * * *